(12) United States Patent
Ishikawa

(10) Patent No.: US 12,534,792 B2
(45) Date of Patent: Jan. 27, 2026

(54) THERMAL SPRAY PARTICLE, METHOD FOR PRODUCING THERMAL SPRAY PARTICLES, AND THERMAL SPRAY COATING FILM

(71) Applicant: AGC Inc., Tokyo (JP)

(72) Inventor: Yasunari Ishikawa, Tokyo (JP)

(73) Assignee: AGC Inc., Tokyo (JP)

( * ) Notice: Subject to any disclaimer, the term of this patent is extended or adjusted under 35 U.S.C. 154(b) by 0 days.

(21) Appl. No.: 18/321,864

(22) Filed: May 23, 2023

(65) Prior Publication Data

US 2023/0313357 A1 Oct. 5, 2023

Related U.S. Application Data

(63) Continuation of application No. PCT/JP2021/044056, filed on Dec. 1, 2021.

(30) Foreign Application Priority Data

Dec. 4, 2020 (JP) ................... 2020-202261

(51) Int. Cl.
| | | |
|---|---|---|
| *C23C 4/067* | (2016.01) | |
| *B22F 1/065* | (2022.01) | |
| *C23C 4/126* | (2016.01) | |
| *C23C 4/129* | (2016.01) | |
| *C23C 4/18* | (2006.01) | |

(52) U.S. Cl.
CPC .............. *C23C 4/067* (2016.01); *B22F 1/065* (2022.01); *C23C 4/126* (2016.01); *C23C 4/129* (2016.01); *C23C 4/18* (2013.01)

(58) Field of Classification Search
None
See application file for complete search history.

(56) References Cited

U.S. PATENT DOCUMENTS 4,694,036 A 9/1987 Baldi
2019/0352760 A1* 11/2019 Hamashima ........ C22C 33/0228

FOREIGN PATENT DOCUMENTS

| GB | 821728 A | 10/1959 |
|---|---|---|
| RU | 2 675 711 C1 | 12/2018 |
| WO | WO 2018/116856 A1 | 6/2018 |

* cited by examiner

*Primary Examiner* — Daniel J. Schleis
(74) *Attorney, Agent, or Firm* — Oblon, McClelland, Maier & Neustadt, L.L.P.

(57) ABSTRACT

A thermal spray particle is substantially spherical, and contains iron and aluminum. An amount of aluminum contained in the thermal spray particle is in a range of 32 wt % to 48 wt %. The thermal spray particle includes a first region, in which a concentration of aluminum is in a range of 22 wt % to 37 wt %; and a second region, in which a concentration of aluminum is in a range of 40 wt % to 50 wt %.

21 Claims, 13 Drawing Sheets

FIG.11
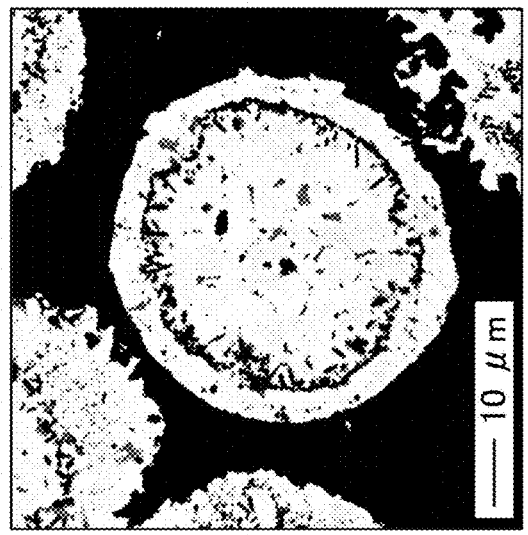
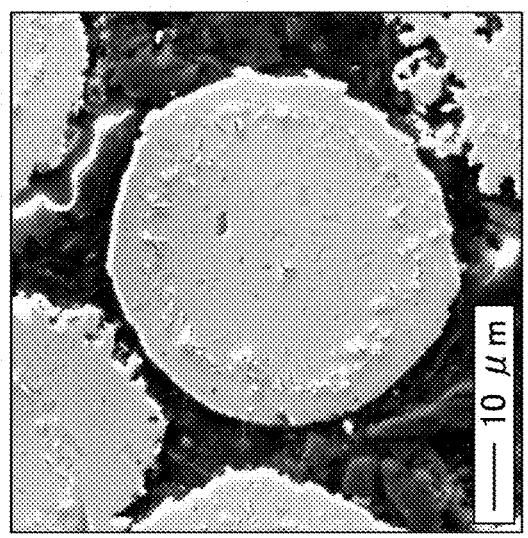
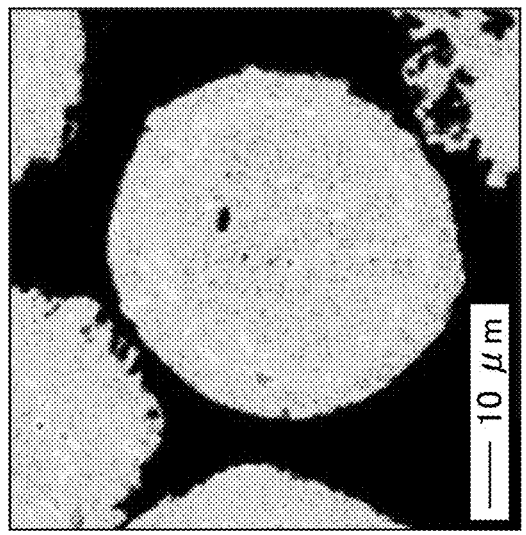
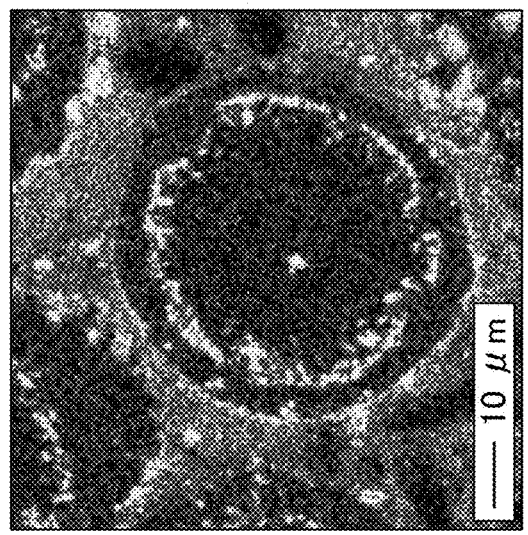

FIG.14
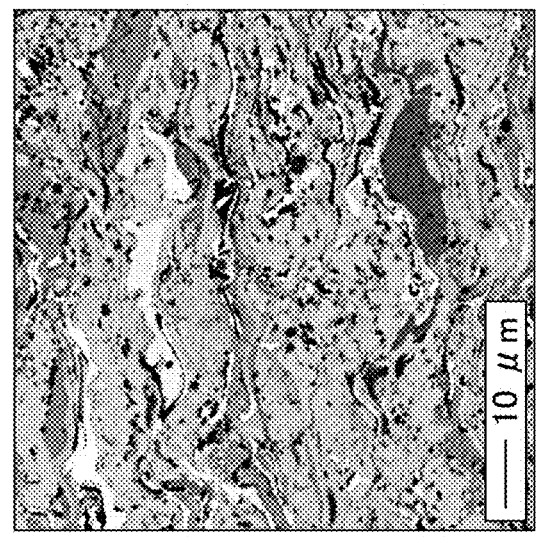
REFLECTED ELECTRON IMAGE
Fe
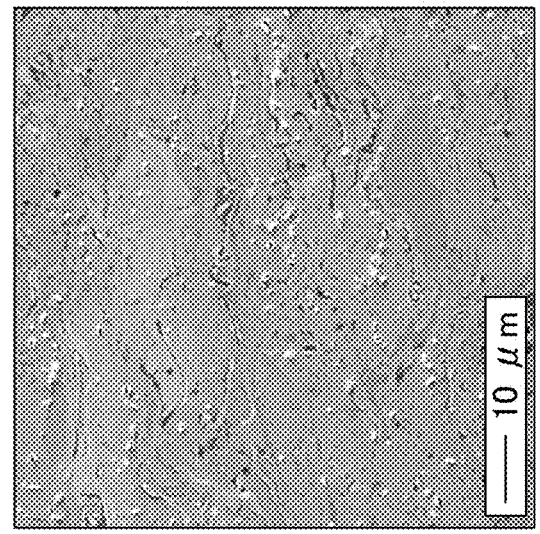
SECONDARY ELECTRON IMAGE
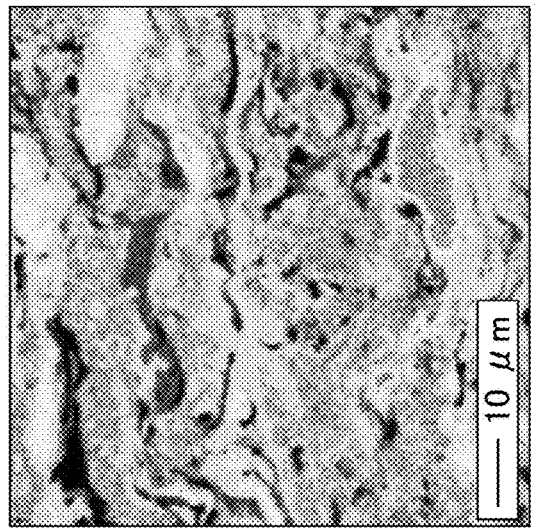
Al
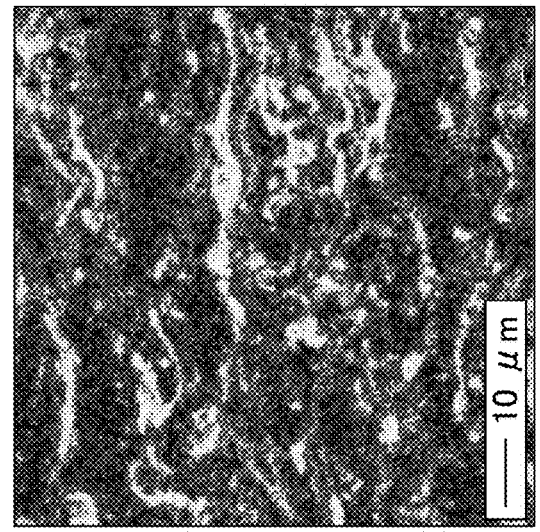
O S Kα1        60 μm S Kα1        60 μm

THERMAL SPRAY PARTICLE, METHOD FOR PRODUCING THERMAL SPRAY PARTICLES, AND THERMAL SPRAY COATING FILM

CROSS-REFERENCE TO RELATED APPLICATION

The present application is a continuation application of International Application No. PCT/JP2021/044056, filed Dec. 1, 2021, which claims priority to Japanese Patent Application No. 2020-202261 filed Dec. 4, 2020. The contents of these applications are incorporated herein by reference in their entirety.

BACKGROUND OF THE INVENTION

1. Field of the Invention

The present invention relates to a thermal spray particle, a method for producing thermal spray particles, and a thermal spray coating film.

2. Description of the Related Art

Thermal spraying techniques for forming coating films on surfaces of treatment-target objects by melting and spraying particles of metal, ceramic, or the like using heat sources have been used in various fields.

For example, WO 2018/116856 describes that atmospheric plasma spraying is performed using a feedstock powder for thermal spray coating containing iron and aluminum to form a thermal coating film of an iron-aluminum-based intermetallic compound on a surface of stainless steel.

SUMMARY OF THE INVENTION

Problems to be Solved by the Invention

WO 2018/116856 describes that the thermal spray coating film described in WO 2018/116856 can be used as a surface treatment coating film for a metal constituting a glass-conveying roll.

However, according to the inventors of the present application, it is understood that the thermal spray coating film obtained by the method described in WO 2018/116856 is not so good in high-temperature sulfidation resistance.

The feedstock powder for thermal spray coating in WO 2018/116856 is prepared by firing a mixed powder containing an iron-aluminum intermetallic compound powder and an iron-containing powder at a high temperature. According to the inventors of the present invention, it is recognized that each particle contained in the feedstock powder for thermal spray coating has an aluminum-deficient region. Therefore, it is considered that even in the thermal spray coating film formed by using such a feedstock powder for thermal spray coating, an aluminum-deficient region occurs, and as a result, good high-temperature sulfidation resistance cannot be obtained.

Thus, there is still a need for a thermal spray technique for forming a thermal spray coating film having good high-temperature sulfidation resistance.

The present invention has been made in view of the above-described background, and an object of the present invention is to provide a thermal spray particle having better high-temperature sulfidation resistance than the conventional thermal spray particle. Furthermore, the present invention aims at providing a method for producing the thermal spray particles. Moreover, the present invention aims at providing a thermal spray coating film having better high-temperature sulfidation resistance than the conventional thermal spray coating film.

Means for Solving the Problem

According to an aspect of the present invention, a thermal spray particle being substantially spherical and containing iron and aluminum, an amount of aluminum contained in the thermal spray particle being in a range of 32 wt % to 48 wt %, and including a first region, in which a concentration of aluminum is in a range of 22 wt % to 37 wt %; and a second region, in which a concentration of aluminum is in a range of 40 wt % to 50 wt %, is provided.

According to another aspect of the present invention, a method for producing thermal spray particles including mixing treatment-target particles containing iron, an aluminum source, an activating agent containing a halide, and plural sintering inhibitors, to obtain mixed particles; heating the mixed particles to perform calorizing treatment for the treatment-target particles using gaps formed by the plural sintering inhibitors, thereby obtaining a treated mixture containing aluminum-permeated particles, the gaps being between adjacent sintering inhibitors of the plural sintering inhibitors; and removing the sintering inhibitors from the treated mixture, to recover thermal spray particles, is provided.

According to yet another aspect of the present invention, a thermal spray coating film containing an aluminum-iron alloy, a weight ratio (Al/Fe) of aluminum to iron contained in one flattened particle being in a range of 32/68 to 48/52, and acicular or spherical oxides having a maximum dimension in a range of 0.1 μm to 2 μm being intermingled in the flattened particle, is provided.

Effects of the Invention

According to the present invention, a thermal spray particle having better high-temperature sulfidation resistance than the conventional thermal spray particle can be provided. Further, according to the present invention, a method for producing such thermal spray particles can be provided. Further, according to the present invention, a thermal spray coating film having better high-temperature sulfidation resistance than the conventional thermal spray coating film can be provided.

BRIEF DESCRIPTION OF THE DRAWINGS

Other objects and further features of the present disclosure will be apparent from the following detailed description when read in conjunction with the accompanying drawings, in which:

FIG. 11 are diagrams showing a cross section of a thermal spray particle (Sample 5) recovered in yet still another embodiment of the present invention, and distributions of elements contained in the cross section;

FIG. 14 is a view showing a result of an EPMA analysis for a part of the cross section of the thermal spray coating film shown in FIG. 12;

DESCRIPTION OF THE PREFERRED EMBODIMENT

Figure 1:
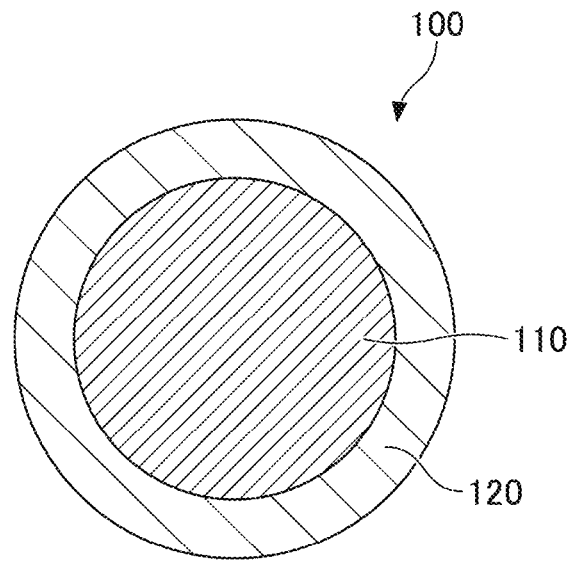
FIG. 1 is a view schematically showing a cross section of a thermal spray particle according to an embodiment of the present invention.

Hereinafter, an embodiment of the present invention will be described.

As described above, the particle contained in the feedstock powder for thermal spray coating described in WO 2018/116856 includes an aluminum-deficient region, and thus an aluminum-deficient region is generated also in the obtained thermal spray coating film. Therefore, the thermal spray coating film in WO 2018/116856 cannot be regarded as having very good high-temperature sulfidation resistance.

On the other hand, in the embodiment of the present invention, a thermal spray particle being substantially spherical and containing iron and aluminum, an amount of aluminum contained in the thermal spray particle being in a range of 32 wt % to 48 wt %, and including a first region, in which a concentration of aluminum is in a range of 22 wt % to 37 wt %; and a second region, in which a concentration of aluminum is in a range of 40 wt % to 50 wt %, is provided.

The thermal spray particle according to the embodiment of the present invention includes the first region, in which the concentration of aluminum is low, and the second region, in which the concentration of aluminum is high. However, in the thermal spray particles, 22 wt % or more of aluminum is present even in the first region. The first region mainly includes an FeAl phase, and the second region mainly includes a mixed phase of $FeAl_2$ and FeAl.

The thermal spray particle according to the embodiment of the present invention contains aluminum throughout the entirety of the particle. Therefore, when a thermal spray coating film is formed using such thermal spray particles, the occurrence of an aluminum-deficient region is significantly suppressed, and a thermal spray coating film having better high-temperature sulfidation resistance than the conventional thermal spray coating film can be provided.

Further, in the embodiment of the present invention, a method for producing thermal spray particles including mixing treatment-target particles containing iron, an aluminum source, an activating agent containing a halide, and plural sintering inhibitors, to obtain mixed particles; heating the mixed particles to perform calorizing treatment for the treatment-target particles using gaps formed by the plural sintering inhibitors, thereby obtaining a treated mixture containing aluminum-permeated particles, the gaps being between adjacent sintering inhibitors of the plural sintering inhibitors; and removing the sintering inhibitors from the treated mixture, to recover thermal spray particles, is provided.

In order to produce the thermal spray particles having the above-described features, in the method according to the embodiment of the present invention, aluminum permeation treatment is performed on the treatment-target particles by using calorizing treatment.

However, when the calorizing treatment is simply applied to the treatment-target particles in the form of particles, there is a high possibility that a thermite reaction will occur. This is because aluminum reacts with a trace amount of oxygen contained in the treatment-target particles.

In addition, when the thermite reaction occurs, the treatment environment becomes extremely high temperature, and the mixture after the treatment (hereinafter, referred to as "treated mixture") becomes a solid-mass form in which all the particles are firmly fixed to each other.

Once such a solid-mass treated mixture is formed, the sintering inhibitors cannot be subsequently separated from the treated mixture. Therefore, there is a problem that the thermal spray particles subjected to the calorizing treatment cannot be recovered from the treated mixture.

On the other hand, in the method according to the embodiment of the present invention, the calorizing treatment is performed by using the gaps formed between the sintering inhibitors.

In this case, even if the thermite reaction occurs in the reaction system, the possibility that the treatment-target particles are fixed to either or both of the sintering inhibitors and the other treatment-target particles can be greatly reduced. This is because the above-mentioned gaps serve to provide numerous "small compartments" for reaction separated from each other.

As a result, the treated mixture produced after the calorizing treatment is not in a form in which the entirety of the mixture is aggregated in a solid-mass form, but in a state in which the thermal spray particles and the sintering inhibitors are separated from each other.

Therefore, in the method according to the embodiment of the present invention, the sintering inhibitors can be relatively easily removed from the treated mixture after the calorizing treatment. Thus, it is possible to separate and recover the thermal spray particles relatively easily.

As described above, in the method according to the embodiment of the present invention, it is possible to appropriately perform the calorizing treatment on the treatment-target particles, to obtain the thermal spray particles containing aluminum throughout the entirety of the body.

Further, in one embodiment of the present invention, a thermal spray coating film, containing an aluminum-iron alloy, a weight ratio (Al/Fe) of aluminum to iron contained in one flattened particle being in a range of 32/68 to 48/52, and acicular or spherical oxides having a maximum dimension in a range of 0.1 µm to 2 µm being intermingled in the flattened particle, is provided.

The thermal spray coating film according to the embodiment of the present invention has not only good high-temperature sulfidation resistance but also good strength due to presence of fine oxides in the flattened particles.

(Thermal Spray Particles According to One Embodiment of the Present Invention)

Next, the thermal spray particle according to the embodiment of the present invention will be described in more detail with reference to the drawings.

FIG. 1 schematically shows a cross section of the thermal spray particle (hereinafter referred to as a "first particle") according to the embodiment of the present invention.

The cross section of the first particle shown in FIG. 1 is the "maximum cross section". In the present application, "maximum cross section" means a cross section passing through the center of the particle. For example, if the particle is spherical, the size of the "maximum cross section" has substantially the same dimension as the size of the particle.

As shown in FIG. 1, the first particle 100 has a substantially spherical shape. In the present application, "substantially spherical shape" or "substantially spherical" means not only a pure sphere but also an ellipse having a dimensional difference within +20% in an X-axis direction and a Y-axis direction orthogonal to each other.

The cross section of the first particle 100 (maximum cross section (The same applies hereinafter)) has two regions having different aluminum concentrations. Hereinafter, a region having a relatively low aluminum concentration will be referred to as a "first region 110", and a region having a relatively high aluminum concentration will be referred to as a "second region 120".

As shown in FIG. 1, in the first particle 100, a core portion constitutes the first region 110 and an outer layer constitutes the second region 120. The second region 120 is arranged so as to surround the first region 110.

In the example shown in FIG. 1, a boundary between the first region 110 and the second region 120 is drawn with a clear line, but a case where the boundary between the two regions is ambiguous is often recognized.

The first particle 100 contains iron and aluminum, and the concentration of aluminum contained in the entirety of the cross section of the first particle 100 is in a range of 32 wt % to 48 wt %. The concentration of aluminum may be, for example, in a range of 35 wt % to 45 wt %.

The concentration of iron contained in the entirety of the cross section of the first particle 100 may be, for example, in a range of 52 wt % to 68 wt %. However, when the first particle 100 further contains an element, which will be described later, the concentration of iron decreases below this range.

The concentrations of aluminum and iron contained in the entirety of the cross section of the first particle 100 can be measured by an energy dispersive X-ray (EDX) analysis method or an electron probe microanalyzer (EPMA) analysis method.

The first particle 100 may contain an element other than iron and aluminum (hereinafter referred to as a "third element"). The third element includes, for example, chromium, nickel, manganese, phosphorus, sulfur, carbon, or any combination thereof.

The third element may be contained in a range of 0.05 wt % to 1 wt % in total. When the third element is contained in the first particle 100, the concentration of iron becomes a concentration obtained by subtracting the concentration of the third element from the above-described range (52 wt % to 68 wt %). That is, the third element is present as an alternative element to iron or an inevitable impurity.

The first region 110 of the first particle 100 mainly includes an FeAl phase. The concentration of aluminum contained in the first region 110 is in a range of 22 wt % to 37 wt %. The concentration of aluminum may be, for example, in a range of 25 wt % to 35 wt %.

On the other hand, the second region 120 of the first particle 100 mainly includes a mixed phase of an FeAl phase and a $FeAl_2$ phase. The concentration of aluminum contained in the second region 120 is in a range of 40 wt % to 50 wt %. The concentration of aluminum may be, for example, in a range of 42 wt % to 48 wt %.

Note that the concentrations of aluminum in the first region 110 and the second region 120 of the first particle 100 can be measured by EDX analysis method or EPMA analysis method that selects the respective portions. Constituent phases included in the first region 110 and the second region 120 can be identified by X-ray diffraction analysis method.

In the cross section of the first particle 100, a percentage of an area occupied by the second region 120 is, for example, 5% or more. The area percentage can be evaluated by binarizing and defining a contrast of an Al concentration using a SEM backscattered electron image of the cross section.

An average particle size of the first particles 100 is in a range of 5 µm to 200 µm. The average particle size of the first particles 100 is preferably in a range of 10 µm to 100 µm.

The average particle size of the thermal spray particles according to the embodiment of the present invention is measured by the method specified in JIS Z 8801 as described later.

In the first particle 100, aluminum is contained throughout the entirety of the particle. Therefore, when a thermal spray coating film is formed by using the first particles 100 as thermal spray particles, the occurrence of an aluminum-deficient region can be significantly suppressed.

Therefore, the first particles 100 can be used as thermal spray particles when forming a thermal spray coating film having excellent high-temperature sulfidation resistance.

(Thermal Spray Particles According to Another Embodiment of the Present Invention)

Next, a thermal spray particle according to another embodiment of the present invention will be described with reference to FIG. 2.

Figure 2:
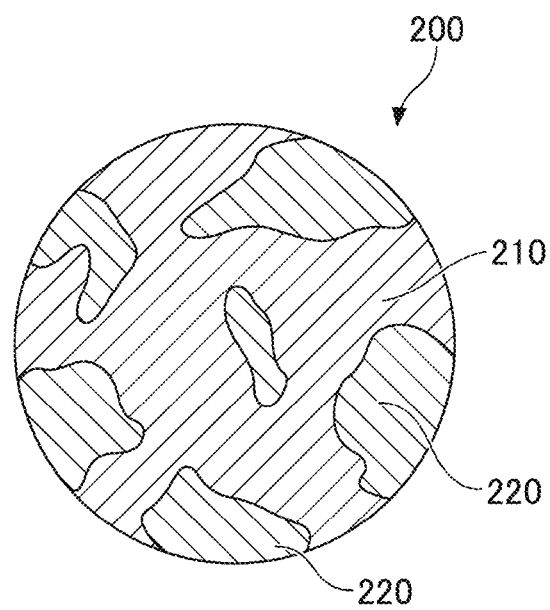
FIG. 2 is a view schematically showing a cross section of a thermal spray particle according to another embodiment of the present invention.

FIG. 2 schematically shows a cross section of a thermal spray particle (hereinafter referred to as a "second particle") according to the other embodiment of the present invention.

The cross section shown in FIG. 2 is the "maximum cross section" of the second particle.

As shown in FIG. 2, the second particle 200 has a substantially spherical shape. The cross section of the second particle 200 includes two types of regions with different aluminum concentrations.

However, in the case of the second particle 200, unlike the first particle 100 described above, two types of regions are arranged in a "patchy manner".

That is, in the second particle 200, the second region 220 having a relatively high aluminum concentration is distributed in an "island pattern" with respect to a "sea" of the first region 210 having a relatively low aluminum concentration.

In other words, the entirety of the cross section of the second particle 200 is constituted by the "sea-like" first region 210 and the second region 220 with the "island pattern". In the case of the second particle 200, both the first region 210 and the second region 220 are present even on the outermost surface.

The second particle 200 contains iron and aluminum, and the concentration of aluminum contained in the entirety of the cross section of the second particle 200 is in a range of 32 wt % to 48 wt %. The concentration of aluminum may be, for example, in a range of 35 wt % to 45 wt %.

The concentration of iron contained in the entirety of the cross section of the second particle 200 may be, for example, in a range of 52 wt % to 68 wt %. However, in the same manner as described above, in the case where the second particle 200 contains the third element, the concentration of iron decreases below this range.

The first region 210 of the second particle 200 mainly includes a FeAl phase. The concentration of aluminum contained in the first region 210 is in a range of 22 wt % to 37 wt %. The concentration of aluminum may be, for example, in a range of 25 wt % to 35 wt %.

On the other hand, the second region 220 of the second particle 200 mainly includes a mixed phase of an FeAl phase and a $FeAl_2$ phase. The concentration of aluminum contained in the second region 220 is in a range of 40 wt % to 50 wt %. The concentration of aluminum may be, for example, in a range of 42 wt % to 48 wt %.

An average particle size of the second particles 200 is in a range of 5 μm to 200 μm. The average particle size of the second particles 200 is preferably in a range of 10 μm to 100 μm.

The percentage of an area occupied by the second region 220 in the cross section of the second particle 200 is, for example, 5% or more.

Also in the case of the second particle 200, aluminum is contained throughout the entirety of the particle. Therefore, when a thermal spray coating film is formed by using the second particles 200 as thermal spray particles, the occurrence of an aluminum-deficient region can be significantly suppressed.

Therefore, the second particles 200 can be used as thermal spray particles when forming a thermal spray coating film having excellent high-temperature sulfidation resistance.

(Thermal Spray Particles According to Yet Another Embodiment of the Present Invention)

Next, a thermal spray particle according to yet another embodiment of the present invention will be described with reference to FIG. 3.

Figure 3:
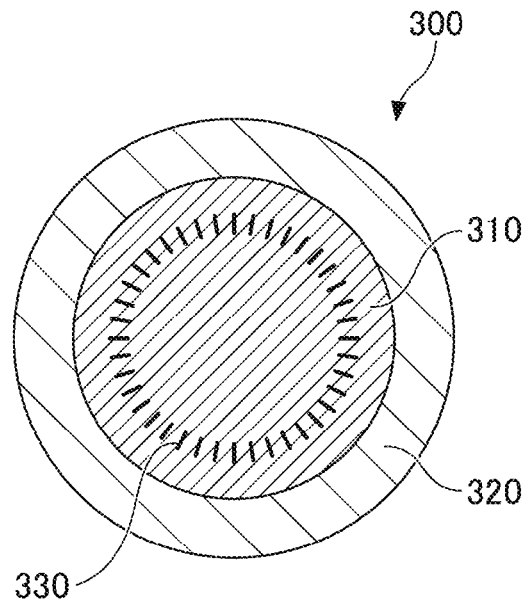
FIG. 3 is a view schematically showing a cross section of a thermal spray particle according to yet another embodiment of the present invention.

FIG. 3 schematically shows a cross section of a thermal spray particle (hereinafter referred to as a "third particle") according to yet another embodiment of the present invention. The cross section shown in FIG. 3 is the "maximum cross section" of the third particle.

As shown in FIG. 3, the third particle 300 has the same form as the first particle 100 shown in FIG. 1 described above. That is, the third particle 300 has a core portion constituting the first region 310 having a relatively low aluminum concentration and an outer layer constituting the second region 320 having a relatively high aluminum concentration.

However, unlike the first particle 100 described above, the third particle 300 includes rod-like (or spherical) precipitates 330.

The precipitates 330 are distributed in a substantially ring shape around the center of the third particle 300 in the cross section. A dimension of each precipitate 330 along the radial direction of the third particle 300 is, for example, in a range of 0.1 μm to 2 μm.

The precipitate 330 is composed of an oxide of aluminum or a composite oxide of aluminum and iron.

Also in the case of the third particle 300, aluminum is contained throughout the entirety of the particle. Therefore, when the third particles 300 are used as thermal spray particles to form a thermal spray coating film, the occurrence of an aluminum-deficient region can be significantly suppressed.

Therefore, the third particles 300 can be used as thermal spray particles when forming a thermal spray coating film having excellent high-temperature sulfidation resistance.

In the third particle 300, high strength is expected to be obtained because the precipitates 330 act in a direction of suppressing dislocation slip.

(Thermal Spray Particles According to Still Another Embodiment of the Present Invention)

Next, a thermal spray particle according to still another embodiment of the present invention will be described with reference to FIG. 4.

Figure 4:
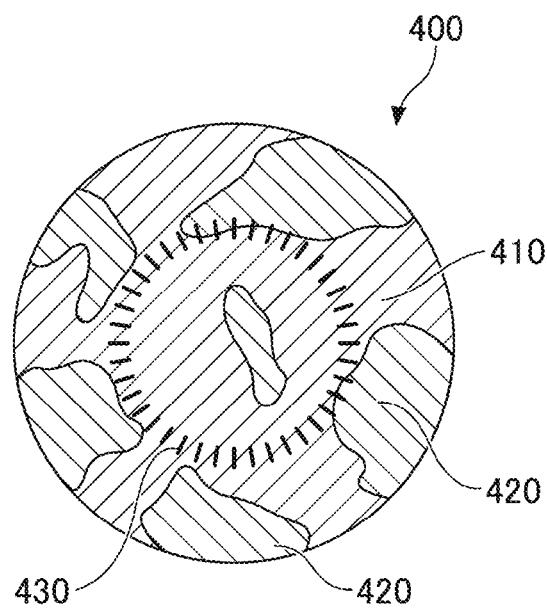
FIG. 4 is a view schematically showing a cross section of a thermal spray particle according to still another embodiment of the present invention.

FIG. 4 schematically shows a cross section of a thermal spray particle (hereinafter referred to as a "fourth particle") according to still another embodiment of the present invention. The cross section shown in FIG. 4 is the "maximum cross section" of the fourth particle.

As shown in FIG. 4, the fourth particle 400 has the same form as the second particle 200 shown in FIG. 2 described above. That is, the fourth particle 400 has a "sea" of a first region 410 having a relatively low aluminum concentration and a second region 420 "island" having a relatively high aluminum concentration.

However, unlike the second particle 200, the fourth particle 400 includes a rod-like (or spherical) precipitates 430.

The precipitates 430 are distributed in a substantially ring shape around the center of the fourth particle 400. The dimension of each precipitate 430 along the radial direction is, for example, in a range of 0.1 μm to 2 μm.

The precipitate 430 is composed of an oxide of aluminum or a composite oxide of aluminum and iron.

Also in the case of the fourth particle 400, aluminum is contained throughout the entirety of the particle. Therefore, when the fourth particles 400 are used as thermal spray particles to form a thermal spray coating film, the occurrence of an aluminum-deficient region can be significantly suppressed.

Therefore, the fourth particles 400 can be used as thermal spray particles when forming a thermal spray coating film having excellent high-temperature sulfidation resistance.

In the fourth particle 400, high strength is expected to be obtained because the precipitates 430 act in a direction of suppressing dislocation slip.

As describe above, the features of the thermal spray particles according to the embodiment of the present invention have been described using the first particles 100 to the fourth particles 400 as examples.

However, the first particles 100 to the fourth particles 400 are merely examples, and the thermal spray particles according to the embodiment of the present invention may have a form different from these particles.

For example, the thermal spray particle according to the embodiment of the present invention may have a form obtained by combining the particle form shown in FIG. 1 and the particle form shown in FIG. 2.

In this case, in the core-shell-shaped particle form shown in FIG. 1, the second region may also be distributed within the first region. Or, conversely, the first region may be distributed within the second region.

In general, in the case where a temperature of heat treatment is relatively low; heating time is relatively short in a production process of particles; or the temperature is relatively low and the heating time is relatively short in the production process of the particles described later, the first particle 100 as shown in FIG. 1 highly tends to be obtained. In addition, in the case where the temperature of the heat treatment is relatively high; the heating time is relatively long; or the temperature is relatively high and the heating time is relatively long in the production process of particles described below, the particles tend to be in the form of the second particles 200 as shown in FIG. 2.

(Method for Producing Thermal Spray Particles According to the Embodiment of the Present Invention)

Next, a method for producing thermal spray particles according to the embodiment of the present invention will be described with reference to FIGS. 5 and 6.

Figure 5:
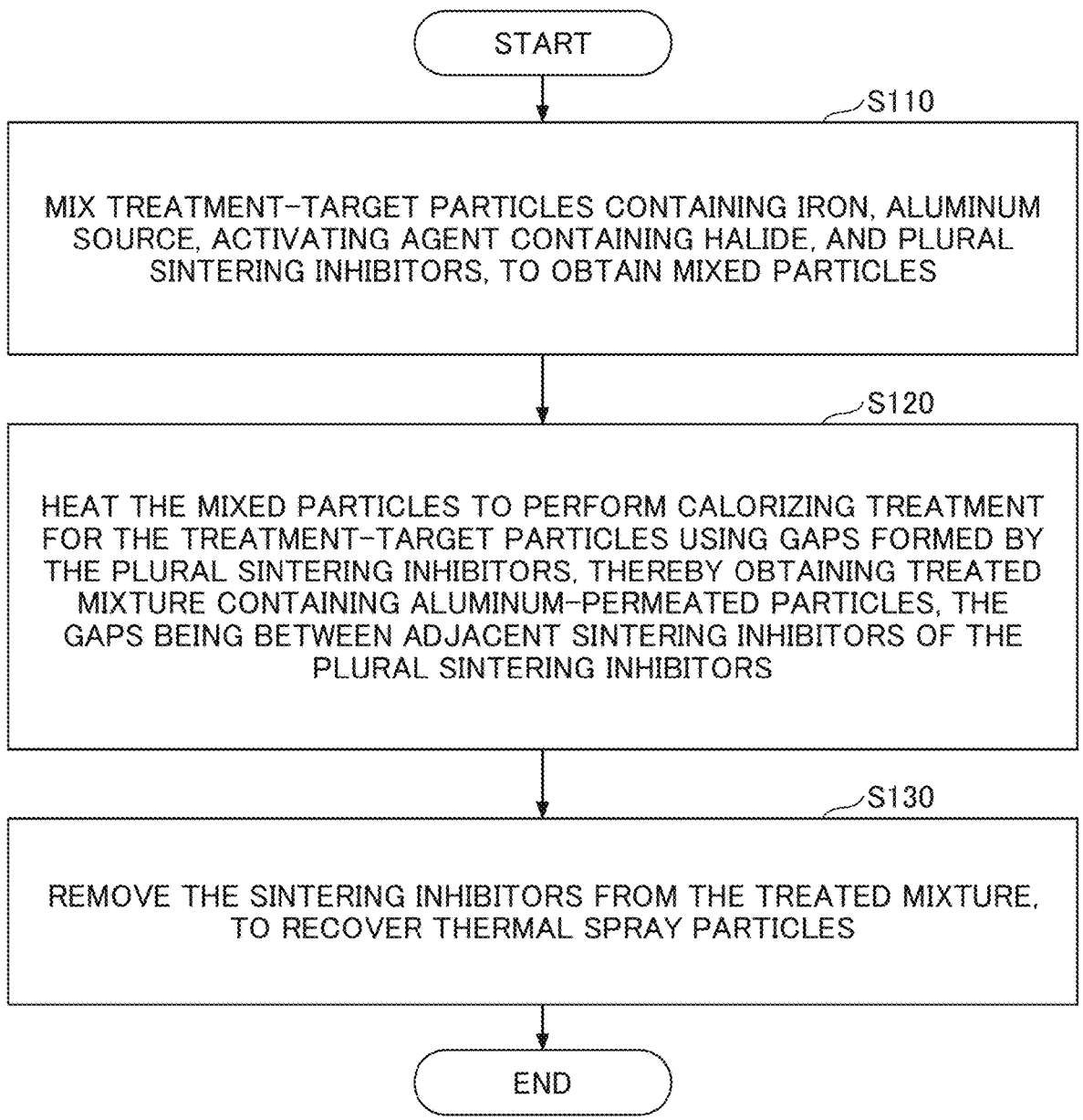
FIG. 5 is a diagram schematically showing an example of a flow of a method for producing thermal spray particles according to the embodiment of the present invention.

FIG. 5 schematically shows an example of a flow of a method for producing thermal spray particles according to the embodiment of the present invention.

As shown in FIG. 5, a method for producing thermal spray particles according to the embodiment of the present invention (hereinafter referred to as a "first production method") includes:

a step of mixing treatment-target particles containing iron, an aluminum source, an activating agent containing a halide, and sintering inhibitors, to prepare mixed particles (Step S110);

a step of heating the mixed particles to perform calorizing treatment for the treatment-target particles using gaps between the sintering inhibitors formed by the sintering inhibitors, to obtain a treated mixture containing aluminum-permeated particles (Step S120); and a step of removing the sintering inhibitors from the treated mixture, to recover thermal spray particles (Step S130).

Hereinafter, each step will be described in more detail.

(Step S110)

First, mixed particles are prepared.

The mixed particles include treatment-target particles, an aluminum source, an activating agent, and sintering inhibitors. Each of the particles will be described in detail below.

(Treatment-Target Particles)

The treatment-target particles contain iron as a main component. The component of the treatment-target particles may be, for example, iron, an iron-aluminum alloy, or stainless steel. These treatment-target particles may contain manganese, phosphorus, sulfur, carbon, and the like as inevitable impurities.

An average particle size of the treatment-target particles is selected so as to be significantly smaller than an average particle size of the sintering inhibitors described later. For example, the average particle size of the treatment-target particles may be 0.29 times or less the average particle size of the sintering inhibitors.

The particle size of the treatment-target particles may be, for example, 10 μm to 600 μm.

In the present application, the "average particle size" is measured by the method specified in JIS Z 8801.

That is, sieves having different mesh sizes are stacked in several stages in an order from a small mesh size, and measurement-target particles are vibrated at a constant amplitude for a constant time, so that the particles are sieved. Next, a weight of particles remaining on each sieve is measured, and the particle size distribution of the weight of particles is graphed. A particle size corresponding to a cumulative value of 50% in the obtained particle size distribution is defined as an "average particle size".

Note that the particle size of the treatment-target particles was represented by a range included a minimum value and a maximum value.

(Aluminum Source)

The aluminum source may be aluminum metal particles, or aluminum alloy particles.

The average particle size of the aluminum source is selected so as to be smaller than the average particle size of the sintering inhibitors. For example, the average particle size of the aluminum source may be 0.29 or less times the average particle size of the sintering inhibitors.

The average particle size of the aluminum source may be, for example, in the range of 10 μm to 200 μm.

The average particle size of the aluminum source is preferably smaller than the average particle size of the treatment-target particles.

(Activating Agent)

The activating agent has a role of promoting the calorizing treatment by forming a vapor of a metal halide during the calorizing treatment of the treatment-target particles.

The activating agent includes, for example, ammonium chloride, iron chloride, aluminum chloride, iron fluoride, aluminum fluoride, or any combination thereof. The activating agent is added, for example, in a range of 0.1 wt % to 2 wt % with respect to the entirety of the mixed particles.

(Sintering Inhibitors)

The sintering inhibitors may include alumina, kaolin, silicon oxide, or any combination thereof.

The sintering inhibitors may have, for example, at least one shape selected from the group consisting of a spherical shape, a triangular pyramid shape, a triangular prism shape, a tetrahedral shape, a conical shape, and a cylindrical shape.

The sintering inhibitors have a sufficiently larger average particle size than that of the treatment-target particles and that of the aluminum source.

For example, as described above, the average particle size of the sintering inhibitors is selected so as to be 3.4 times or more an average particle size of the treatment-target particles and the aluminum source.

For example, when the sintering inhibitors have a substantially spherical shape, the average particle size of the sintering inhibitors may be in a range of 500 μm to 5000 μm.

(Mixed Particles)

Mixed particles are prepared by mixing the above-mentioned components.

A ratio (Al/Fe) of the total aluminum component contained in the mixed particles to the iron component contained in the treatment-target particles is, for example, in a range of 32/68 to 48/52 in weight ratio.

The amount of the treatment-target particles contained in the entirety of the mixed particles is, for example, in a range of 10 wt % to 40 wt %. The amount of the aluminum source contained in the entirety of the mixed particles is, for example, in a range of 2 wt % to 20 wt %. The amount of the sintering inhibitors contained in the entirety of the mixed particles is, for example, in a range of 40 wt % to 80 wt %. (Step S120)

Next, the mixed particles prepared in Step S110 are subjected to heat treatment. Therefore, a reaction vessel may be filled with the mixed particles.

By heating the reaction vessel, the treatment-target particles are subjected to the calorizing treatment. That is, aluminum generated from the aluminum source diffuses and permeates into the treatment-target particles, to form aluminum-permeated particles.

Here, when the aluminum source contained in the mixed particles contains highly active aluminum such as aluminum particles, there is a high possibility that a thermite reaction will occur between the mixed particles when the reaction vessel is heated. This is because the aluminum reacts with a trace amount of oxygen contained in the treatment-target particles, to reduce the treatment-target particles.

When such a thermite reaction occurs, the temperature in the reaction vessel becomes extremely high, and the mixture after the treatment, that is, the "treated mixture" becomes a solid-mass form in which all the particles are firmly fixed to each other. In addition, there is a problem that once such a solid-mass treated mixture is formed, the sintering inhibitors cannot be separated from the treated mixture thereafter.

On the other hand, in the first production method, it is possible to significantly suppress the formation of a solid-mass mixture.

In the following, the above-described feature will be described with reference to FIG. 6.

Figure 6:
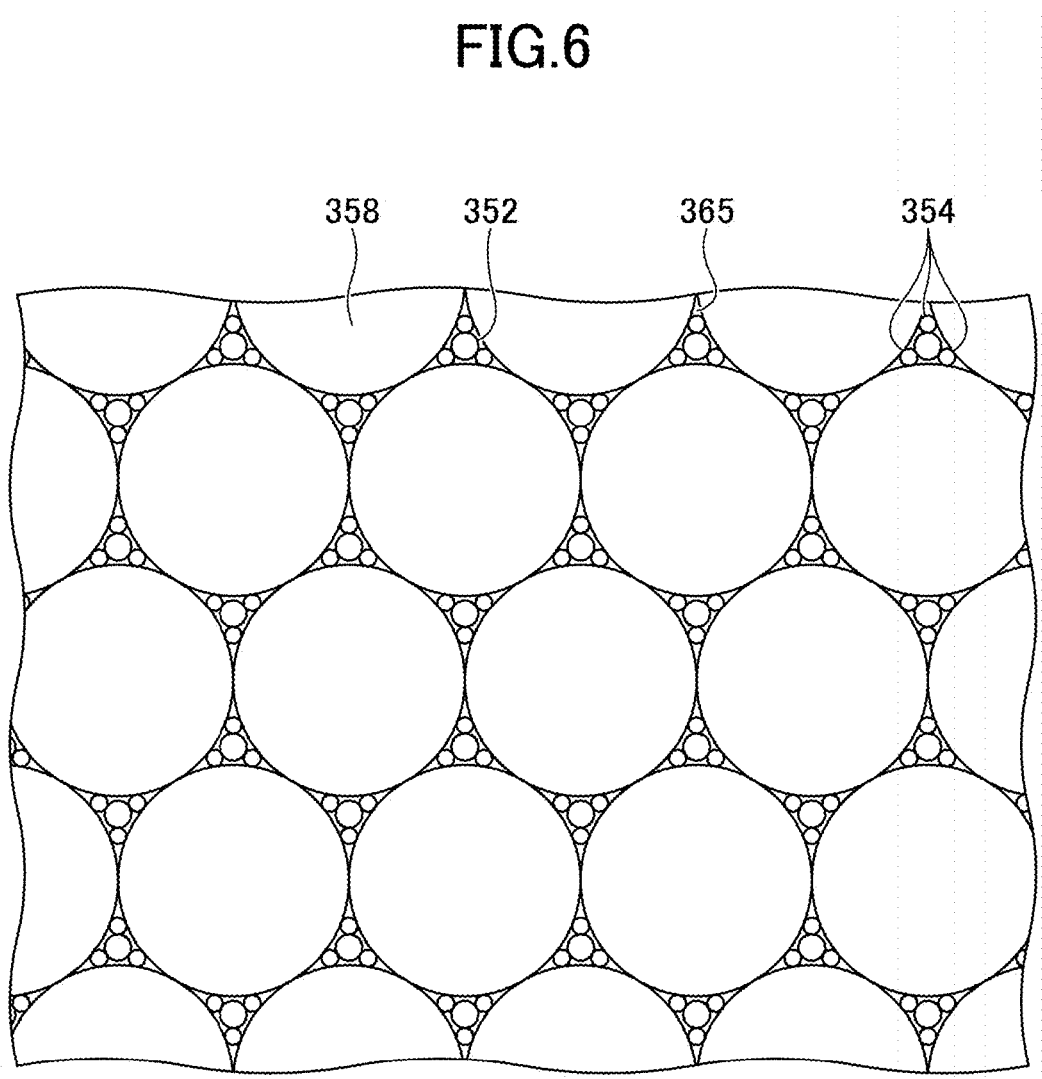
FIG. 6 schematically shows a state of mixed particles after a reaction vessel is filled with the mixed particles.

FIG. 6 schematically shows a state of mixed particles after a reaction vessel is filled with mixed particles. As shown in FIG. 6, the reaction vessel is filled with the treatment-target particles 352, the aluminum source 354, the activating agent, and the sintering inhibitors 358, which are components of the mixed particles.

In FIG. 6, the activating agent is omitted. In addition, each component of the mixed particles is assumed to be spherical in FIG. 6.

Here, when the size (represented by $\phi_S$) of the sintering inhibitors 358 is sufficiently larger than the size (represented by $\phi_{Fe}$) of the treatment-target particle 352 and the size (represented by $\phi_{Al}$) of the aluminum source 354, a gap 365 is formed between the adjacent sintering inhibitors 358. In addition, the treatment-target particles 352 and the aluminum source 354 are disposed in the gap 365 formed by the sintering inhibitors 358.

When the reaction vessel is heated in a state where the mixed particles are arranged as described above, even if a thermite reaction occurs in the reaction vessel, it is possible to greatly reduce the possibility that the treatment-target particles 352 will be fixed to either or both of the sintering inhibitors 358 and the other treatment-target particles 352. This is because the gaps 365 serve to provide numerous "small compartments" for reaction for the calorizing treatment.

As a result, the treated mixture generated after the heat treatment does not have a form in which the entirety of the treated mixture is aggregated in a solid-mass form, but instead has a state in which aluminum-permeated particles and the sintering inhibitors 358 are separated from each other. Thus, it is possible to recover the aluminum-permeated particles, i.e., thermal spray particles, from the treated mixture in a subsequent step.

TABLE 1 below shows examples in which reaction vessels are filled with mixed particles capable of exhibiting the above-described effect.

Here, it is assumed that the treatment-target particles 352 are spherical iron particles (density of 7.87 g/cm³), the aluminum source 354 is spherical aluminum particles (density of 2.70 g/cm³), the activating agent is spherical ammonium-chloride particles (density of 1.527 g/cm³), and the sintering inhibitors 358 are spherical alumina particles (density of 4.00 g/cm³).

In addition, it is assumed that the average particle size $\phi_S$ of the sintering inhibitors 358 is 1,000 μm, the average particle size $\phi_{Fe}$ of the treatment-target particles 352 is 38 μm to 75 μm, the average particle size $\phi_{Al}$ of the aluminum source 354 is 50 μm, and the average particle size of the activating agent is 10 μm.

TABLE 1

| Filling rate by sintering inhibitors [%] | | | | 74 | |
| Filling rate of gaps generated by sintering inhibitors [%] | | | | 100 | 85 |

| Component | Material | Density [g/cm³] | Average particle size [μm] | Weight [kg] | Weight [kg] |
| --- | --- | --- | --- | --- | --- |
| Sintering inhibitors | Al₂O₃ | 4 | 1000 | 10 | 10 |
| Treatment-target particle | Fe | 7.87 | (38-75) * | 2.216 | 1.879 |
| Aluminum source | Al | 2.7 | 50 | 1.491 | 1.253 |
| Activating agent | NH₄Cl | 1.527 | 10 | 0.067 | 0.066 |

* represented by range including a minimum value and a maximum value

According to TABLE 1, when 10 kg of the sintering inhibitors 358 is added at the maximum filling rate, i.e., closest packed, 74% of the total space volume is occupied by the sintering inhibitors 358. Therefore, the gap 365 is 26%.

When the entirety (100%) of the gaps 365 is filled with the treatment-target particles 352, the aluminum source 354, and the activating agent, an amount of the treatment-target particles 352 is 2.216 kg, an amount of the aluminum source 354 is 1.491 kg, and an amount of the activating agent is 0.067 kg, as an example.

Similarly, when 85% of the gaps 365 is filled with the treatment-target particles 352, the aluminum source 354, and the activating agent, the amount of the treatment-target particles 352 can be calculated as 1.879 kg, the amount of the aluminum source 354 can be calculated as 1.253 kg, and the amount of the activating agent can be calculated as 0.066 kg.

In the above calculation, the Al/Fe ratio in the mixed particles is assumed to be 40/60 (weight ratio). The amount of the activating agent is also assumed to be 0.5 wt % of the entirety.

Even in the case where the sintering inhibitors 358 are filled in a manner other than the closest packed, the amounts of the respective components can be calculated in the same manner as above.

When the sintering inhibitors 358 have spherical shapes, the filling rate by the sintering inhibitors 358 are preferably in a range of 55% to 74% (at the closest packed) in order to obtain the above-described effect.

In addition, the filling rate of the gaps 365 generated by the sintering inhibitors 358 by the treatment-target particles 352, the aluminum source 354, and the activating agent is preferably in a range of 60% to 100%.

However, in practice, because a case where the sintering inhibitors 358 have non-spherical shapes are also assumed, the preferable range of the filling rate by the sintering inhibitors 358 is assumed to be 50% to 80%.

As described above, in the first production method, it is possible to perform the calorizing treatment for the treatment-target particles 352 by using the gaps 365 formed between the sintering inhibitors 358.

The treatment atmosphere of the calorizing treatment may be an inert atmosphere not containing oxygen, for example, an argon gas atmosphere.

The treatment temperature is not particularly limited as long as diffusion and permeation of aluminum into the treatment-target particles occurs. The treatment temperature may be, for example, in a range of 800° C. to 1,100° C.

The treatment time is not particularly limited, and is, for example, in a range of 1 hour to 10 hours.

Note that as described above, as the treatment temperature is lower, the treatment time is shorter, or both, a particle in which the second region 120 is arranged in a layered manner around the first region 110 like the above-described first particle 100 is more likely to be obtained. Conversely, as the treatment temperature is higher; the treatment time is longer; or the treatment temperature is higher and the treatment time is longer, a particle such as the above-described second particle 200 is more likely to be obtained.

(Step S130)

Next, the sintering inhibitors are removed from the powdery treated mixture formed in Step S120. The sintering inhibitors may be removed, for example, by sieving the treated mixture using a sieve that allows only particles having small average particle sizes to pass.

As described above, in the first production method, it is possible to significantly suppress an increase in the temperature of the reaction system due to accumulation of excessive heat which may be generated in the thermite reaction.

Therefore, in the first production method, the sintering inhibitors and the thermal spray particles can be relatively easily separated from each other.

In the first production method, aluminum is permeated into the entirety of the treatment-target particle by the calorizing treatment. Therefore, in the first production method, it is possible to form a thermal spray particle in which an aluminum-deficient region is significantly reduced.

(Application Examples of Thermal Spray Particles According to One Embodiment of Present Invention)

The thermal spray particles according to the embodiment of the present invention having the above-described features can be used when forming a thermal spray coating film on a surface of various treatment-target objects.

The thermal spray particle according to the embodiment of the present invention contains aluminum throughout the particle. Therefore, when a thermal spray coating film is formed using the thermal spray particles according to the embodiment of the present invention, a thermal spray coating film of an Fe—Al alloy in which an aluminum-deficient region is significantly suppressed can be formed.

For example, in the thermal spray coating film, a weight ratio of aluminum to iron (Al/Fe) contained in one flattened particle forming the thermal spray coating film may be in a range of 32/68 to 48/52.

Such a thermal spray coating film of an Fe—Al alloy has more excellent high-temperature sulfidation resistance than the conventional films because the aluminum-deficient region is significantly suppressed. For example, the thermal spray coating film formed using the thermal spray particles according to the embodiment of the present invention can also be applied to a surface of a metal constituting a glass conveyance roll exposed to a high-temperature sulfidation environment.

When a thermal spray coating film is formed using the thermal spray particles according to the embodiment of the present invention, the type of thermal spraying is not particularly limited.

For example, the thermal spray particles according to the embodiment of the present invention can be applied to various thermal spraying methods such as plasma spraying, detonation flame spraying, and high velocity oxy-flame (HVOF) spraying.

In particular, when thermal spraying is performed using the fourth particles 400 including the precipitates 430 as shown in FIG. 4 described above, a thermal spray coating film in which oxide particles are dispersed in each flattened particle is formed. The oxide particles may have an acicular or spherical form and have a maximum dimension in a range of 0.1 μm to 2 μm.

Such a thermal spray coating film is considered to exhibit relatively high strength.

EXAMPLES

In the following, examples of the present invention will be described. In the following description, Examples 1 to 5 and Examples 21 to 22 are practical examples, and Examples 11 and 31 are comparative examples.

Example 1

Thermal spray particles were prepared by the following method.

First, iron particles (13.20 wt %) as the treatment-target particles, aluminum particles (9.96 wt %) as the aluminum source, ammonium chloride particles (0.5 wt %) as the activating agent, and spherical alumina particles (76.34 wt %) as the sintering inhibitors were sufficiently mixed, to prepare mixed particles.

The iron particles had a particle size of 10 μm to 75 μm, the aluminum particles had an average particle size of 50 μm, the activating agent had a particle size of 10 μm, and the alumina particles had a particle size of 1,000 μm.

A heat-resistant vessel is filled with the mixed particles. In calculation, the filling rate by the alumina particles was 74%. The iron particles, the aluminum particles, and the ammonium chloride particles were filled so as to occupy 85% of gaps of the remaining 26%.

Next, the inside of the heat-resistant vessel was replaced with an argon atmosphere, and then the heat-resistant vessel was heated to 1,000° C. After holding the heat-resistant vessel at 1,000° C. for 10 hours, the heat-resistant vessel was cooled in a furnace.

Thereafter, the treated mixture was taken out from the heat-resistant vessel and passed through a #32 mesh sieve to remove alumina particles. Thus, spherical particles (hereinafter referred to as "particles according to Example 1") were recovered.

Example 2

Iron particles subjected to the calorizing treatment (hereinafter referred to as "particles according to Example 2") were prepared by the same method as in Example 1.

However, in Example 2, the content of the iron particles contained in the mixed particles was 14.24 wt %, the content of the aluminum particles was 9.49 wt %, the content of the ammonium chloride particles as the activating agent was 0.5 wt %, and the content of the spherical alumina particles as the sintering inhibitors was 75.77 wt %.

The other conditions such as the filling rate by the alumina particles were the same as in Example 1.

Example 3

Iron particles subjected to the calorizing treatment (hereinafter referred to as "particles according to Example 3") were prepared by the same method as in Example 1.

However, in Example 3, the content of the iron particles contained in the mixed particles was 15.71 wt %, the content of the aluminum particles was 8.83 wt %, the content of the ammonium chloride particles as the activating agent was 0.5 wt %, and the content of the spherical alumina particles as the sintering inhibitors was 74.96 wt %.

The other conditions such as the filling rate by the alumina particles were the same as in Example 1.

Example 4

Iron particles subjected to the calorizing treatment (hereinafter referred to as "particles according to Example 4") were prepared by the same method as in Example 1.

However, in Example 4, the content of the iron particles contained in the mixed particles was 16.87 wt %, the content of the aluminum particles was 8.31 wt %, the content of the ammonium chloride particles as the activating agent was 0.5 wt %, and the content of the spherical alumina particles as the sintering inhibitors was 74.32 wt %.

The other conditions such as the filling rate by the alumina particles were the same as in Example 1.

Example 5

Thermal spray particles (hereinafter referred to as "thermal spray particles according to Example 5") were prepared by the same method as in Example 3.

In Example 5, however, the inside of the heat-resistant vessel was replaced with an argon atmosphere, and then the heat-resistant vessel was heated to 1,100° C. After holding at 1,100° C. for 10 hours, the heat-resistant vessel was cooled in the furnace.

Example 11

Preparation of thermal spray particles was attempted by the same method as in Example 1.

However, in Example 11, the average particle size of the iron particles contained in the mixed particles was 50 μm, the average particle size of the aluminum particles was 50 μm, and the average particle size of the alumina particles was 60 μm. The content of the iron particles contained in the mixed particles was 56.00 wt %, the content of the aluminum particles was 24.00 wt %, the content of the ammonium chloride particles as the activating agent was 0.50 wt %, and the content of the alumina particles was 19.50 wt %.

The heating temperature was 1,000° C., and the heating time was 10 hours.

The treated mixture obtained after the heat treatment was solid-mass, and it was difficult to separate and remove the alumina particles.

The content and the particle size of each component contained in the mixed particles used in each Example are summarized in TABLE 2 below.

TABLE 2

|  | Iron particle | | Aluminum particle | | Activating agent | | Alumina particle | |
| --- | --- | --- | --- | --- | --- | --- | --- | --- |
| Ex. | Particle size [μm] | Content [wt %] | Average particle size [μm] | Content [wt %] | Average particle size [μm] | Content [wt %] | Average particle size [μm] | Content [wt %] |
| 1 | 10-75 | 13.20 | 50 | 9.96 | 10 | 0.5 | 1000 | 76.34 |
| 2 | 10-75 | 14.24 | 50 | 9.49 | 10 | 0.5 | 1000 | 75.77 |
| 3 | 10-75 | 15.71 | 50 | 8.83 | 10 | 0.5 | 1000 | 74.96 |
| 4 | 10-75 | 16.87 | 50 | 8.31 | 10 | 0.5 | 1000 | 74.32 |
| 5 | 10-75 | 15.71 | 50 | 8.83 | 10 | 0.5 | 1000 | 74.96 |
| 11 | 50 | 56 | 50 | 24 | 10 | 0.5 | 60 | 19.5 |

The filling rate by the alumina particles in the thermal spray particles and the filling rate of the gaps by the other components used in each Example are summarized in TABLE 3 below.

TABLE 3

| Example | Filling rate by alumina particle [%] | Filling rate of gaps [%] |
| --- | --- | --- |
| 1 | 74 | 85 |
| 2 | 74 | 85 |
| 3 | 74 | 85 |
| 4 | 74 | 85 |
| 5 | 74 | 85 |
| 11 | — | — |

In Example 11, description of the filling rates was omitted because the particle size of the alumina particles was substantially the same as the particle sizes of the other components.

(Evaluation)

Using the thermal spray particles according to each Example, the average particle size was measured and forms of the particles were observed.

(Average Particle Size)

The average particle size of the thermal spray particles according to each Example was determined from the particle size distribution obtained using a particle size measuring apparatus (LA-950V2; HORIBA, Ltd.).

(Analysis)

Using the thermal spray particles according to each Example, a cross section observation sample was prepared by the following method.

First, the plurality of thermal spray particles were embedded in a resin, and the resin was cured. Next, the resin was polished with abrasive paper and a buff polishing apparatus to expose a cross section of the thermal spray particle.

The observation target was set to be a thermal spray particle having the "maximum cross section". Hereinafter, in the thermal spray particles according to Examples 1 to 5, thermal spray particles serving as the observation targets are referred to as "Sample 1" to "Sample 5".

In Samples 1 to 4, cross sections of the thermal spray particles were observed with an SEM. For Sample 5, a cross section of the thermal spray particle was observed by an EPMA. Further, amounts of iron and aluminum contained in the cross sections of the thermal spray particles were evaluated by an EDX analysis.

Figure 7A:
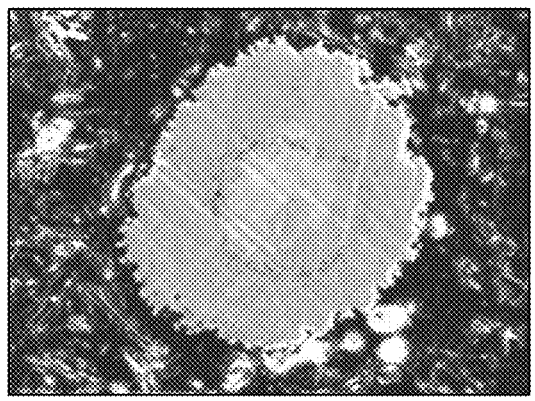
FIG. 7A is a diagram showing a cross section of a thermal spray particle (sample 1) recovered in the embodiment of the present invention.
Figure 7B:
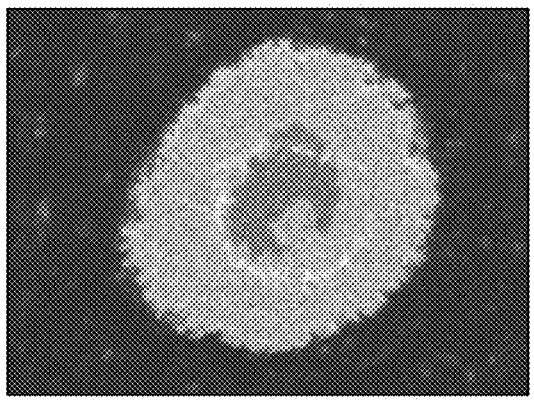
FIG. 7B is a diagram showing a distribution of aluminum contained in the cross section.

FIG. 7A shows a cross section of the thermal spray particle recovered in Sample 1, and FIG. 7B shows a distribution of aluminum contained in the cross section. It should be noted that a distribution of iron contained in the cross section was in a form such that the distribution of aluminum was inverted.

From FIGS. 7A and 7B, it was found that in Sample 1 the cross section of the thermal spray particle was in the form of the first particle 100 described above. That is, the cross section had a two-layer structure of a core portion having a low aluminum concentration and an outer layer having a high aluminum concentration.

As a result of measuring an area percentage of the region having a high aluminum concentration (second region), the area percentage of the second region was 78%.

The concentrations of iron and aluminum in each of the first region and the second region were measured by the EDX. As a result, the concentration of iron in the first region was 63.3%, and the concentration of iron in the second region was 31.3%. The aluminum concentration in the first region was 31.4%, and the aluminum concentration in the second region was 49.4%.

From this result, it is presumed that the first region is mainly composed of an FeAl phase, whereas the second region is a mixed phase of an $FeAl_2$ phase and an FeAl phase.

Figure 8A:
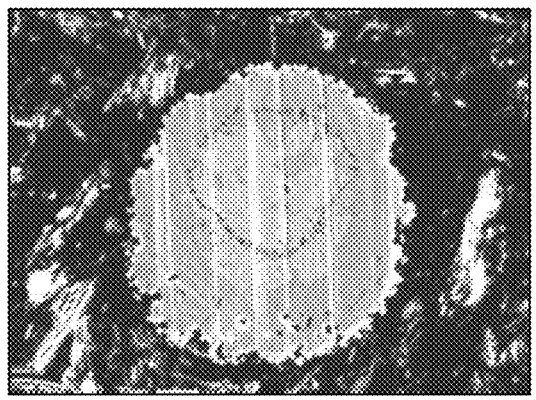
FIG. 8A is a diagram showing a cross section of a thermal spray particle (sample 2) recovered in another embodiment of the present invention.
Figure 8B:
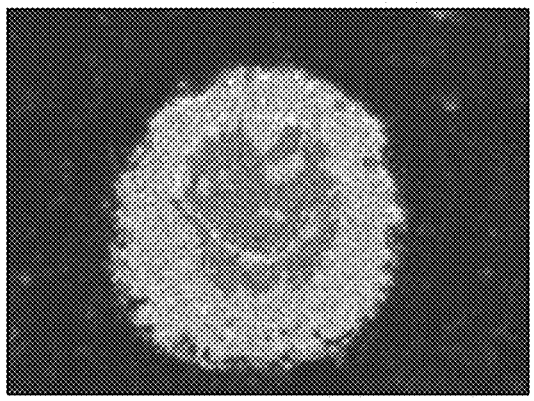
FIG. 8B is a diagram showing a distribution of aluminum contained in the cross section.

FIG. 8A shows a cross section of the thermal spray particle recovered in Sample 2, and FIG. 8B shows a distribution of aluminum contained in the cross section. It should be noted that a distribution of iron contained in the cross section was in a form such that the distribution of aluminum was inverted.

From FIGS. 8A and 8B, it was found that in Sample 2 the cross section of the thermal spray particle was in the form of the first particle 100 described above. That is, the cross section had a two-layer structure of a core portion having a low aluminum concentration and an outer layer having a high aluminum concentration.

As a result of measuring an area percentage of the region having a high aluminum concentration (second region), the area percentage of the second region was 53%.

The concentrations of iron and aluminum in each of the first region and the second region were analyzed by the EDX. As a result, the concentration of iron in the first region was 63.5%, and the concentration of iron in the second region was 50.4%. The aluminum concentration in the first region was 30.5%, and the aluminum concentration in the second region was 47.4%.

From this result, it is presumed that the first region is mainly composed of an FeAl phase, whereas the second region is a mixed phase of an $FeAl_2$ phase and an FeAl phase.

Figure 9A:
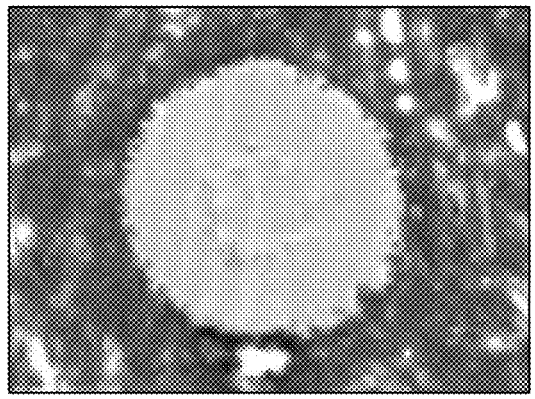
FIG. 9A is a diagram showing a cross section of a thermal spray particle (sample 3) recovered in yet another embodiment of the present invention.
Figure 9B:
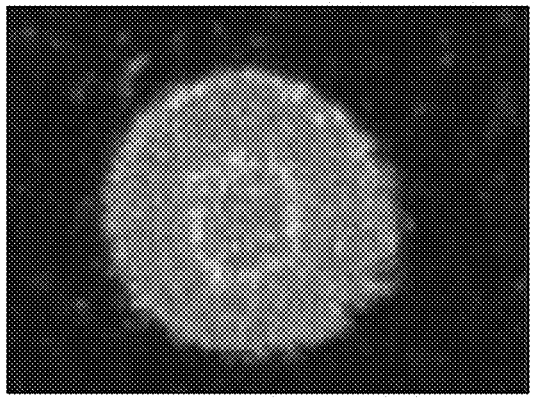
FIG. 9B is a diagram showing a distribution of aluminum contained in the cross section.

FIG. 9A shows a cross section of the thermal spray particle recovered in Sample 3, and FIG. 9B shows a distribution of aluminum contained in the cross section. It should be noted that a distribution of iron contained in the cross section was in a form such that the distribution of aluminum was inverted.

From FIGS. 9A and 9B, it was found that in Sample 3, regions having a low aluminum concentration and regions having a high aluminum concentration are dispersed in the cross section of the thermal spray particle.

As a result of measuring an area percentage of the region having a high aluminum concentration (second region), the area percentage of the second region was 19%.

The concentrations of iron and aluminum in each of the first region and the second region were analyzed by the EDX. As a result, the concentration of iron in the first region was 61.8%, and the concentration of iron in the second region was 48.3%. The aluminum concentration in the first region was 31.4%, and the aluminum concentration in the second region was 44.9%.

From this result, it is presumed that the first region is mainly composed of an FeAl phase, whereas the second region is a mixed phase of an $FeAl_2$ phase and an FeAl phase.

Figure 10A:
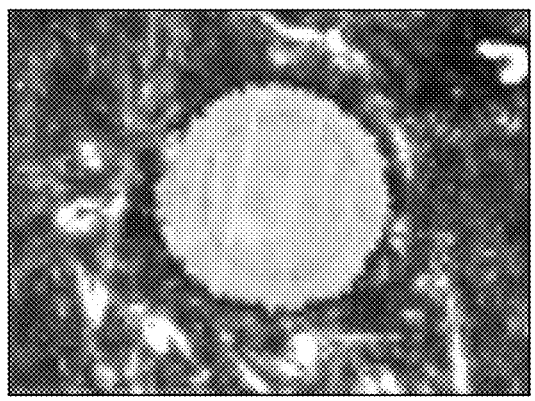
FIG. 10A is a diagram showing a cross section of a thermal spray particle (sample 4) recovered in still another embodiment of the present invention.
Figure 10B:
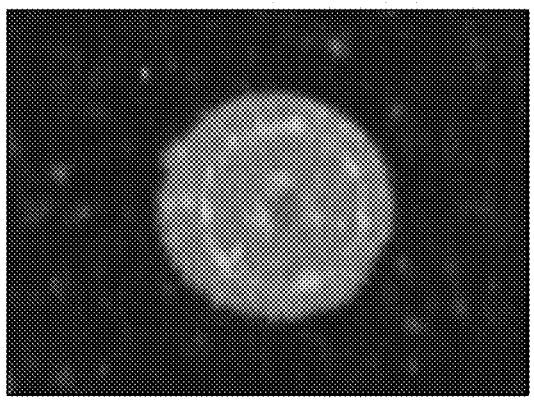
FIG. 10B is a diagram showing a distribution of aluminum contained in the cross section.

FIG. 10A shows a cross section of the thermal spray particle recovered in Sample 4, and FIG. 10B shows a distribution of aluminum contained in the cross section. It should be noted that a distribution of iron contained in the cross section was in a form such that the distribution of aluminum was inverted.

From FIGS. 10A and 10B, it was found that also in Sample 4, similarly to Sample 3, regions having a low aluminum concentration and regions having a high aluminum concentration were dispersed in the cross section of the thermal spray particle.

As a result of measuring an area percentage of the region having a high aluminum concentration (second region), the area percentage of the second region was 9%.

The concentrations of iron and aluminum in each of the first region and the second region were analyzed by the EDX. As a result, the concentration of iron in the first region was 66.5%, and the concentration of iron in the second region was 52.7%. The aluminum concentration in the first region was 31.4%, and the aluminum concentration in the second region was 40.7%.

From this result, it is presumed that the first region is mainly composed of an FeAl phase, whereas the second region is a mixed phase of an $FeAl_2$ phase and an FeAl phase.

FIG. 11 shows a cross section (a backscattered electron image and a secondary electron image) of the thermal spray particle recovered in Sample 5, and distributions of aluminum, iron, and oxygen contained in the cross section.

From FIG. 11, it was confirmed that regions having a low aluminum concentration and regions having a high aluminum concentration were dispersed in the cross section of the thermal spray particle in Sample 5. However, in Sample 5, it was found that aluminum oxide was precipitated and dispersed in a ring shape with respect to the center of the particle.

As a result of measuring an area percentage of the region having a high aluminum concentration excluding the oxide (second region), the area percentage of the second region was 10%.

The concentrations of iron and aluminum in each of the first region and the second region were analyzed by the EDX. As a result, the concentration of iron in the first region was 65.9%, and the concentration of iron in the second region was 53.4%. The aluminum concentration in the first region was 33.1%, and the aluminum concentration in the second region was 46.6%.

From this result, it is presumed that the first region is mainly composed of an FeAl phase, whereas the second region is a mixed phase of an $FeAl_2$ phase and an FeAl phase.

Next, the energy dispersive X-ray (EDX) analysis was performed on the cross section recovered in each Sample, to evaluate the concentrations of aluminum and iron contained in the entirety of the cross section of the thermal spray particle.

TABLE 4 below summarizes results of analysis obtained for each Sample.

TABLE 4

| Sample | Iron concentration of entirety [mass %] | Aluminum concentration of entirety [mass %] |
| --- | --- | --- |
| 1 | 56.6 | 43.8 |
| 2 | 58.2 | 39.4 |
| 3 | 62.5 | 37.0 |
| 4 | 67.3 | 33.0 |
| 5 | 64.6 | 35.4 |

Thus, it was found that Sample 1 to Sample 5 contained aluminum in a range of 32 wt % to 48 wt %.

Example 21

A thermal spray coating film was actually formed using the thermal spray particles according to the embodiment of the present invention, and characteristics thereof were evaluated.

For the thermal spray particles, thermal spray particles recovered by classifying the above-described thermal spray particles according to Example 5 using sieves with nominal openings of 20 μm and 45 μm so that the particle size thereof was in a range of the minimum value of 20 μm to the maximum value of 45 μm were used.

Using the classified thermal spray particles, a thermal spray coating film was formed on a surface of a stainless-steel (SUS304) substrate by the HVOF thermal spraying method.

Conditions for the thermal spraying were as follows.
Spray distance: 350 mm;
Barrel length: 152.4 mm;
Oxygen flow rate: 46.7 m³/h (1,650 SCFH);
Fuel flow rate: 22.7 L/h (6.0 GPH);
Combustion ratio: 0.99; and
Particle size of thermal spray particles: 20 μm to 45 μm.

The target film thickness of the thermal spray coating film was 200 μm.

The resulting substrate with a thermal spray coating film will be referred to as "Sample 21".

Figure 12:
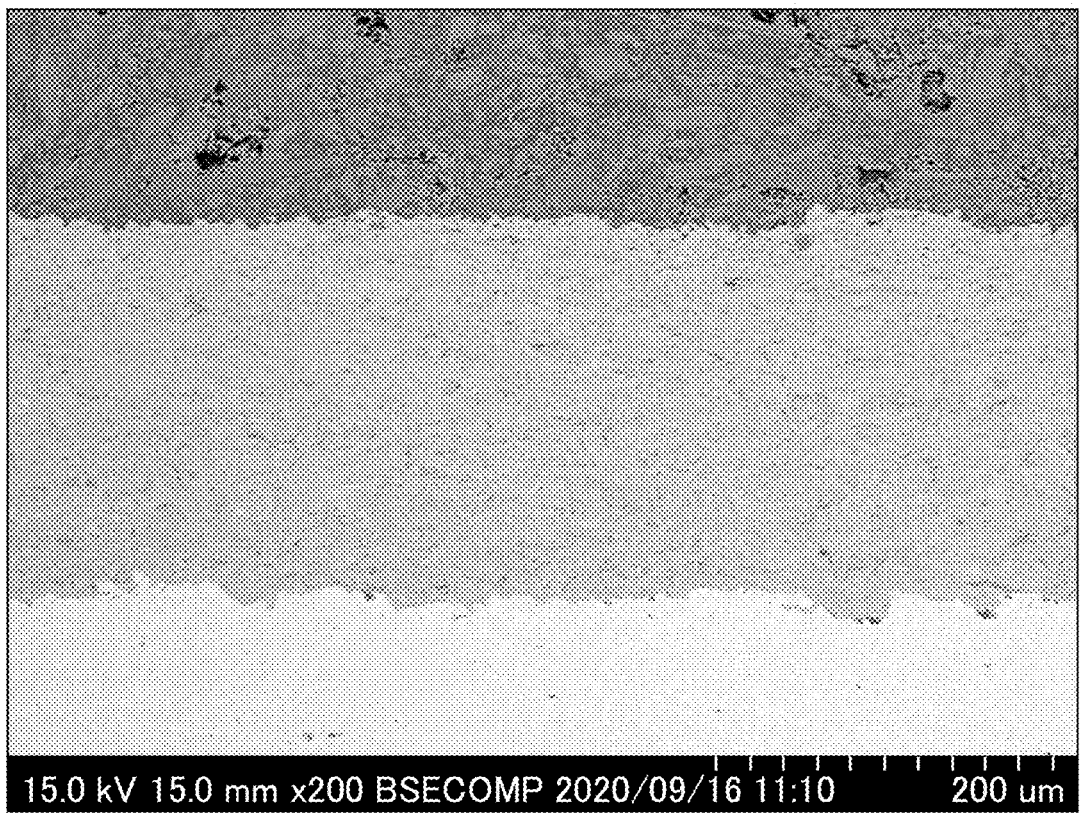
FIG. 12 is a cross-sectional photograph of a thermal spray coating film in the embodiment of the present invention.
Figure 13:
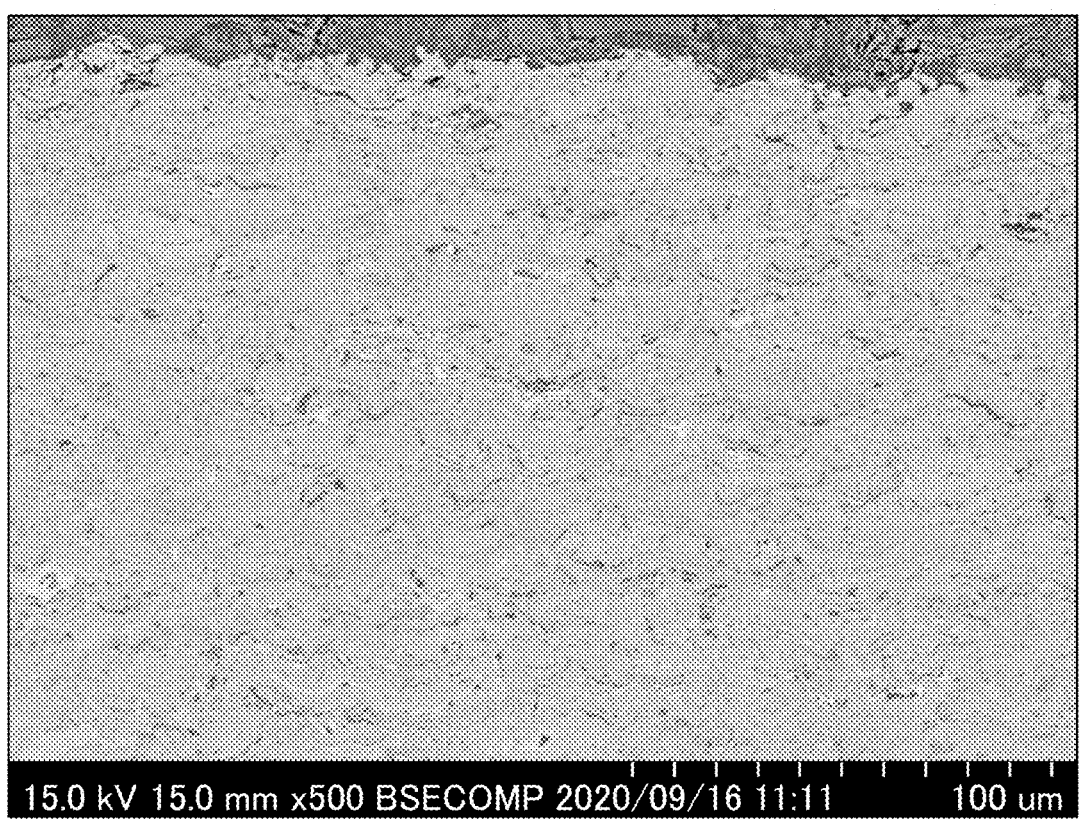
FIG. 13 is an enlarged cross-sectional photograph of the thermal spray coating film shown in FIG. 12.

FIGS. 12 and 13 show cross sections of Sample 21. FIG. 13 is an enlarged view of FIG. 12.

FIG. 14 shows a result of EPMA analysis of a part of the cross section of Sample 21.

From FIG. 14, it is found that in Sample 21, an oxide containing aluminum is present between adjacent flattened particles and inside each of the flattened particles.

It is considered that the oxide between flattened particles was formed by oxidation of the particles during the thermal spraying. On the other hand, it is considered that the oxide inside each of the flattened particles corresponds to the oxide precipitate (see the ring-shaped precipitate in FIG. 11) contained in the thermal spray particles used in the preparation of Sample 21.

The thermal spray coating film having the above-described form is considered to have significant strength as compared with conventional coating films.

Example 22

A thermal spray coating film was formed on a surface of a stainless-steel substrate in the same manner as in Example 21. In Example 22, however, the above-described thermal spray particles according to Example 3 were used. In Example 22, detonation spraying was used as the spraying method instead of HVOF spraying.

The resulting substrate with a thermal spray coating film will be referred to as "Sample 22".

Example 31

A thermal spray coating film was formed on a surface of a stainless-steel substrate in the same manner as in Example 21. In Example 31, however, the particles described in WO 2018/116856 were used as the feedstock for thermal spray coating. Plasma spraying was used instead of HVOF spraying as the spraying method.

The resulting substrate with a thermal spray coating film will be referred to as "Sample 31".

(High-Temperature Corrosion Resistance Test)

Samples 21, 22, and 31 were subjected to a high-temperature corrosion resistance test as follows.

Each Sample was exposed to an atmosphere of nitrogen ($N_2$) and sulfur dioxide ($SO_2$) (1,000 ppm) at 700° C. for 100 hours, and a surface of the thermal spray coating film was analyzed.

Figure 15:
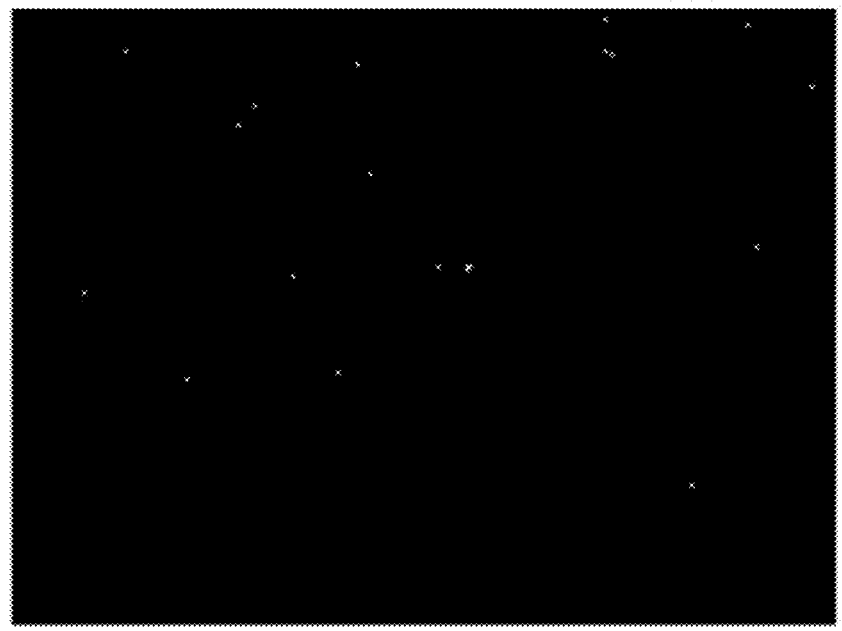
FIG. 15 is an EDX mapping diagram of sulfur (S) after a high-temperature corrosion resistance test for a thermal spray coating film in the embodiment of the present invention.
Figure 16:
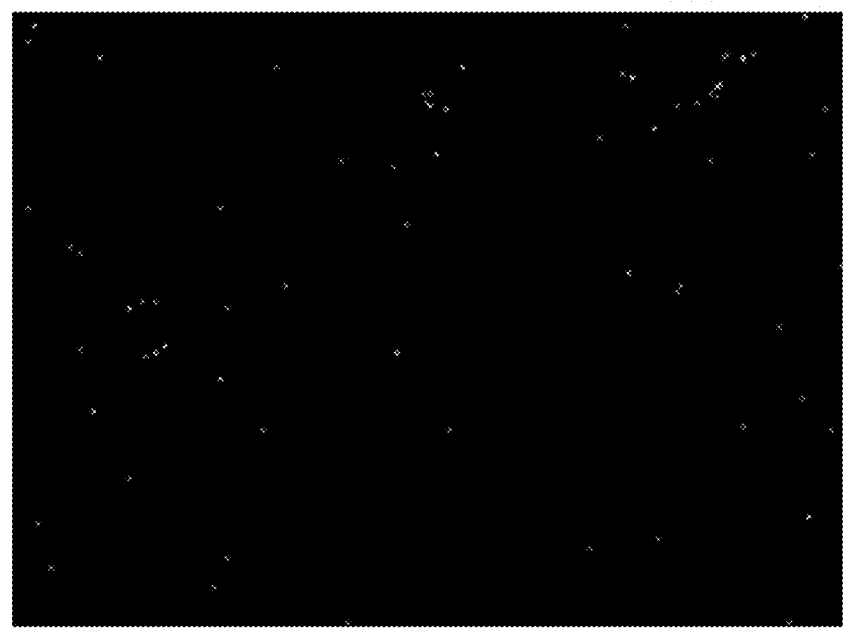
FIG. 16 is an EDX mapping diagram of sulfur (S) after the high-temperature corrosion resistance test for another thermal spray coating film in the embodiment of the present invention.
Figure 17:
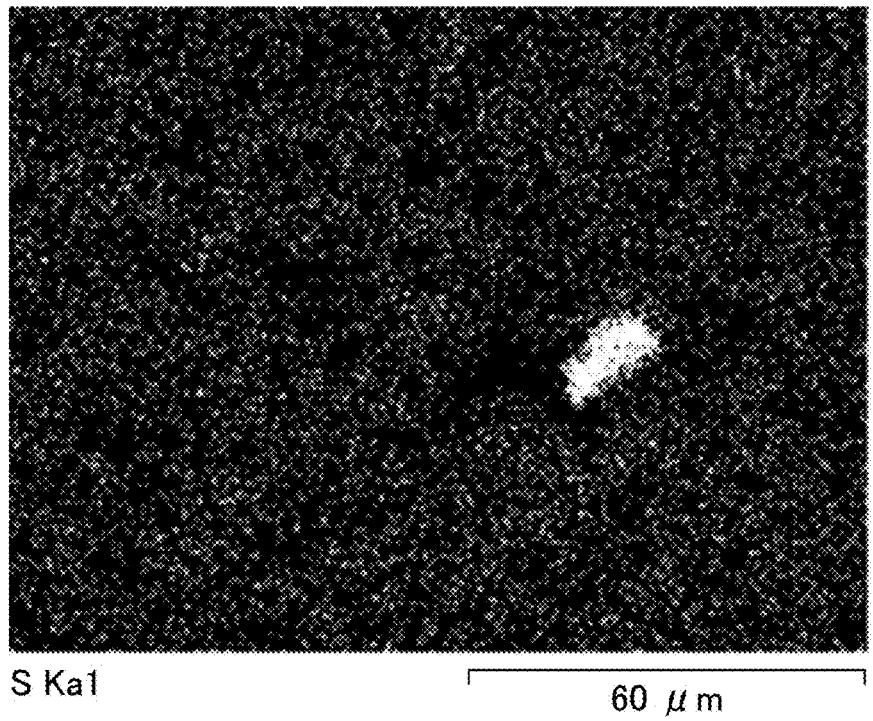
FIG. 17 is an EDX mapping diagram of sulfur (S) after the high-temperature corrosion resistance test for a thermal spray coating film in a comparative example.

FIGS. 15 to 17 show EDX mapping results of a sulfur (S) component obtained in each Sample. FIG. 15 shows a result for Sample 21, FIG. 16 shows a result for Sample 22, and FIG. 17 shows a result for Sample 31.

FIG. 17 shows that a presence of a sulfur component was observed on the surface of Sample 31. On the other hand, in Samples 21 and 22, no sulfur component was detected on the surface.

Thus, it was confirmed that Sample 21 and Sample 22 are provided with good high-temperature sulfidation resistance compared to Sample 31.

The sample 21 was subjected to the high-temperature corrosion resistance test under a more severe environment. That is, the test environment was changed to an atmosphere of $N_2+SO_2$ (3,000 ppm) at 700° C., and exposure was performed for 400 hours.

The EDX mapping of the sulfur (S) component was performed on the surface of Sample 21 after the test. Almost no sulfur component was detected on the surface of Sample 21 after the test.

Next, the sulfur (S) component was analyzed at each thickness position in the cross section of the thermal spray coating film of Sample 21.

Figure 18:
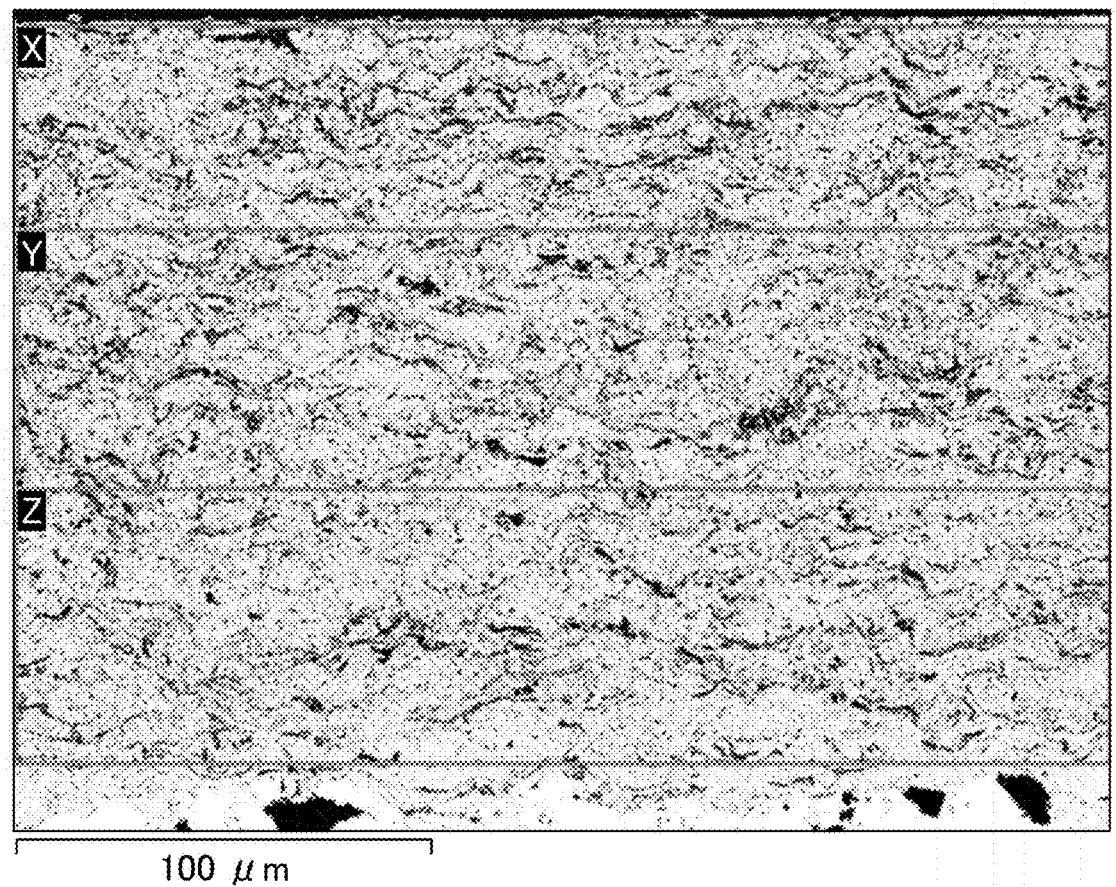
FIG. 18 is an electron microscope picture showing a cross section of sample 21 after the test.

FIG. 18 shows the cross section of Sample 21 after the test. The EDX analysis was performed for the thermal spray coating film at height levels (thickness positions) indicated by symbols X, Y, and Z in FIG. 18.

The results are shown in TABLE 5.

TABLE 5

|   | O | Al | Si | S | Fe | Total |
|---|---|---|---|---|---|---|
| X | 8.4 | 34 | 0.8 | 0 | 56.9 | 100 |
| Y | 8.3 | 33.5 | 0.6 | 0.2 | 57.4 | 100 |
| Z | 6.7 | 32.9 | 0.7 | 0.2 | 59.4 | 100 |

(unit wt %)

From TABLE 5, it was found that in Sample 21, no sulfur component was detected at any thickness position of X to Z of the thermal spray coating film after the test.

As described above, a thermal spray particle, a method for producing thermal spray particles, and a thermal spray coating film according to the present disclosure have been described. However, the present disclosure is not limited to the above-described embodiments and the like. Various variations, modifications, substitutions, additions, deletions, and combinations may be possible within the scope recited in claims. They of course also naturally fall within the technical scope of the present disclosure.

What is claimed is:

1. A thermal spray particle, wherein:
the thermal spray particle is substantially spherical and contains iron and aluminum,
an amount of the aluminum contained in the thermal spray particle is in a range of 32 wt % to 48 wt %, and
the thermal spray particle includes
a first region in which a concentration of the aluminum is in a range of 22 wt % to 37 wt %;
a second region, in which a concentration of the aluminum is in a range of 40 wt % to 50 wt %;
the first region and the second region are arranged in a patchy manner;
precipitates are composed of an oxide of aluminum or a composite oxide of aluminum and iron;
precipitates are distributed in a substantially ring shape around the center of the thermal spray particle, and
the precipitates are acicular or spherical oxides as having a maximum dimension in a range of 0.1 μm to 2 μm are intermingled in the thermal spray particle.

2. The thermal spray particle according to claim 1, wherein the core portion of the particle includes an FeAl phase, and the outer layer of the particle includes an FeAl phase and an $FeAl_2$ phase.

3. The thermal spray particle according to claim 1, wherein an area percentage occupied by the outer layer is 5% or more in a cross section passing through a center of the particle.

4. The thermal spray particle according to claim 2, wherein an area percentage occupied by the outer layer is 5% or more in a cross section passing through a center of the particle.

5. The thermal spray particle according to claim 1, wherein a plurality of particles each comprising the particle is formed such that an average particle size of the particles is in a range of 10 μm to 100 μm.

6. A method for producing the thermal spray particle of claim 1, comprising:
mixing treatment-target particles comprising iron, an aluminum source, an activating agent comprising a halide, and a plurality of sintering inhibitors, to obtain mixed particles;
heating the mixed particles to perform calorizing treatment for the treatment-target particles with gaps formed by the plurality of sintering inhibitors, thereby obtaining a treated mixture comprising aluminum-permeated particles, the gaps being between adjacent sintering inhibitors of the plurality of sintering inhibitors; and removing the sintering inhibitors from the treated mixture, to recover thermal spray particles.

7. The method for producing thermal spray particles according to claim 6, wherein a reaction vessel is filled with the mixed particles, and a filling rate by the sintering inhibitors with respect to a volume of the reaction vessel is in a range of 50% to 80%.

8. The method for producing thermal spray particles according to claim 6, wherein the sintering inhibitors have at least one shape selected from a spherical shape, a triangular pyramid shape, a triangular prism shape, a tetrahedral shape, a conical shape, and a cylindrical shape.

9. The method for producing thermal spray particles according to claim 6, wherein the sintering inhibitors include at least one selected from the group consisting of alumina, kaolin, and silicon oxide.

10. The method for producing thermal spray particles according to claim 6, wherein an average particle size of the treatment-target particles is 0.29 times or less an average particle diameter of the sintering inhibitors.

11. The method for producing thermal spray particles according to claim 6, wherein an average particle size of the aluminum source is 0.29 times or less an average particle size of the sintering inhibitors.

12. The method for producing thermal spray particles according to claim 6, wherein an average particle size of the treatment-target particles is in a range of 10 μm to 200 μm.

13. The method for producing thermal spray particles according to claim 6, wherein an average particle size of the sintering inhibitors is in a range of 500 μm to 5,000 μm.

14. The method for producing thermal spray particles according to claim 6, wherein a ratio (Al/Fe) of an aluminum component in the mixed particles to an iron component in the treatment-target particles is in a range of 32/68 to 48/52 in weight ratio.

15. The method for producing thermal spray particles according to claim 6, wherein an amount of the treatment-target particles is in a range of 10 wt % to 30 wt % with respect to an entirety of the mixed particles.

16. The method for producing thermal spray particles according to claim 6, wherein an amount of the aluminum source is in a range of 8 wt % to 18 wt % with respect to an entirety of the mixed particles.

17. The method for producing thermal spray particles according to claim 6, wherein an amount of the activating agent is in a range of 0.1 wt % to 2 wt % with respect to an entirety of the mixed particles.

18. The method for producing thermal spray particles according to claim 6, wherein an amount of the sintering inhibitors is in a range of 50 wt % to 80 wt % with respect to an entirety of the mixed particles.

19. The method for producing thermal spray particles according to claim 6, wherein the activating agent comprises at least one selected from the group consisting of ammonium chloride, iron chloride, aluminum chloride, iron fluoride, and aluminum fluoride.

20. A thermal spray coating film containing an aluminum-iron alloy, comprising:
a plurality of flattened particles each comprising the thermal spray particle of claim 1 such that a weight ratio of the aluminum to the iron in each of the flattened particles is in a range of 32/68 to 48/52.

21. A thermal spray coating film containing an aluminum-iron alloy, comprising:
   a plurality of thermal spray particles each comprising the thermal spray particle of claim 1.

* * * * *